(12) United States Patent
Minesawa et al.

(10) Patent No.: US 10,181,738 B2
(45) Date of Patent: Jan. 15, 2019

(54) DISCHARGE CONTROL DEVICE

(71) Applicant: KEIHIN CORPORATION, Shinjuku-ku, Tokyo (JP)

(72) Inventors: Ryutaro Minesawa, Utsunomiya (JP); Ikuo Sasanuma, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 70 days.

(21) Appl. No.: 15/353,203

(22) Filed: Nov. 16, 2016

(65) Prior Publication Data

US 2017/0179747 A1    Jun. 22, 2017

(30) Foreign Application Priority Data

Dec. 22, 2015    (JP) ................................. 2015-250305

(51) Int. Cl.
*H02J 7/00*    (2006.01)

(52) U.S. Cl.
CPC .......... *H02J 7/0065* (2013.01); *H02J 7/0029* (2013.01); *H02J 7/0047* (2013.01); *H02J 7/0068* (2013.01)

(58) Field of Classification Search
CPC ....... H02J 7/0031; H02J 7/0047; Y02E 60/12; G01R 31/3648; H01M 10/48
USPC ....................................................... 320/136
See application file for complete search history.

(56) References Cited

U.S. PATENT DOCUMENTS

| | | | | |
|---|---|---|---|---|
| 2009/0119034 A1* | 5/2009 | Oohasi | ................. | B60L 3/0046 |
| | | | | 702/57 |
| 2012/0025613 A1* | 2/2012 | Morita | ...................... | B60L 3/00 |
| | | | | 307/64 |
| 2013/0057219 A1* | 3/2013 | Sakata | ................ | B60L 11/1866 |
| | | | | 320/118 |
| 2015/0034406 A1* | 2/2015 | Hirose | .................. | B60L 3/0046 |
| | | | | 180/279 |
| 2015/0102691 A1* | 4/2015 | Kollreutter | ............ | H02H 9/008 |
| | | | | 307/328 |
| 2015/0349547 A1* | 12/2015 | Jeon | ................... | G01R 31/3648 |
| | | | | 320/134 |

FOREIGN PATENT DOCUMENTS

| | | |
|---|---|---|
| JP | 2003204608 A | 7/2003 |
| JP | 2012186893 A | 9/2012 |
| JP | 2013059164 A | 3/2013 |

(Continued)

OTHER PUBLICATIONS

Notice of Reasons for Rejection for corresponding JP Application No. 2015-250305; dated Aug. 15, 2017.

(Continued)

*Primary Examiner* — Arun C Williams

(74) *Attorney, Agent, or Firm* — Cantor Colburn LLP

(57) ABSTRACT

A discharge control device includes a discharge circuit configured to include a switch and a resistor to discharge charges of a smoothing capacitor and a power converter which are connected to a high-voltage power supply. The discharge circuit sets the switch to an ON state to start the discharging for a fixed period when an ignition switch is changed from the ON state to an OFF state. The discharge circuit sets the switch to the OFF state to stop the discharging when the ignition switch is changed from the OFF state to the ON state during a period in which the discharge circuit performs the discharging.

3 Claims, 3 Drawing Sheets

(56) References Cited

FOREIGN PATENT DOCUMENTS

| | | |
|---|---|---|
| JP | 2013187941 A | 9/2013 |
| JP | 2014110666 A1 | 6/2014 |
| JP | 2017099197 A | 6/2017 |

OTHER PUBLICATIONS

Notice of Reasons for Rejection for corresponding Japanese Application No. 2015-250305; dated May 9, 2017.

* cited by examiner

DISCHARGE CONTROL DEVICE

CROSS-REFERENCE TO RELATED APPLICATIONS

The present invention claims priority under 35 U.S.C. § 119 to Japanese Application No. 2015-250305, filed Dec. 22, 2015, the entire content of which is incorporated herein by reference.

BACKGROUND OF THE INVENTION

Field of the Invention

The present invention relates to a discharge control device.

Description of Related Art

In conventional technology disclosed in Japanese Unexamined Patent Application, First Publication No. 2013-187941 (hereinafter, Patent Literature 1), a relay of a discharge circuit is in an ON state for a predetermined period to continue a discharge operation in order to consume a charge accumulated in a smoothing capacitor connected to an inverter after an ignition switch is in an OFF state when a vehicle is in a steady state.

SUMMARY OF THE INVENTION

In the conventional technology disclosed in Patent Literature 1, because a contactor (an electromagnetic contactor) is used as a switch of a discharge circuit, the switch of the discharge circuit continues to be in the ON state and the discharge operation of the discharge circuit is not configured to be immediately stopped when the ignition switch is in the ON state again during a discharge period after the ignition switch is switched from the ON state to the OFF state. Furthermore, a button-type ignition system has recently been widely used and there is a need for quickly restarting a system of the vehicle.

An aspect according to the present invention has been made in view of the above-described circumstances, and an objective of the aspect is to provide a discharge control device capable of quickly starting a system of a vehicle when an ignition switch is set in an ON state again during a discharge period after the ignition switch is switched from the ON state to an OFF state.

To achieve the above-described objective, the present invention adopts the following aspects.

According to an aspect of the present invention, a discharge control device includes a discharge circuit configured to include a switch and a resistor to discharge charges of a smoothing capacitor and a power converter which are connected to a high-voltage power supply, wherein the discharge circuit sets the switch to an ON state to start the discharging for a fixed period when an ignition switch is changed from the ON state to an OFF state, and wherein the discharge circuit sets the switch to the OFF state to stop the discharging when the ignition switch is changed from the OFF state to the ON state during a period in which the discharge circuit performs the discharging.

In aspect (1), the discharge circuit may be configured to further include at least one flip-flop circuit, the flip-flop circuit may output a signal for setting the switch of the discharge circuit to the ON state for the fixed period when the ignition switch is changed from the ON state to the OFF state, and the flip-flop circuit may be reset to stop outputting the signal for setting the switch of the discharge circuit to the ON state for the fixed period when the ignition switch is changed from the OFF state to the ON state during the period in which the discharge circuit performs the discharging.

In aspect (2), the discharge circuit may be configured to further include a reset circuit, and the reset circuit may output a reset signal to the flip-flop circuit when the ignition switch is changed from the OFF state to the ON state during the period in which the discharge circuit performs the discharging.

In the aspect (3), the discharge circuit may be configured to further include a differentiation circuit, the differentiation circuit may differentiate a signal indicating the OFF state and the ON state in the ignition switch, and the reset circuit may output the reset signal to the flip-flop circuit when the differentiated signal indicates that the ignition switch is changed from the OFF state to the ON state during the period in which the discharge circuit performs the discharging.

According to the aspects of the present invention, it is possible to quickly start a system of a vehicle when an ignition switch is set in an ON state again during a discharge period after the ignition switch is switched from the ON state to an OFF state.

DETAILED DESCRIPTION OF THE INVENTION

Hereinafter, an embodiment of the present invention will be described with reference to the drawings.

Figure 1:
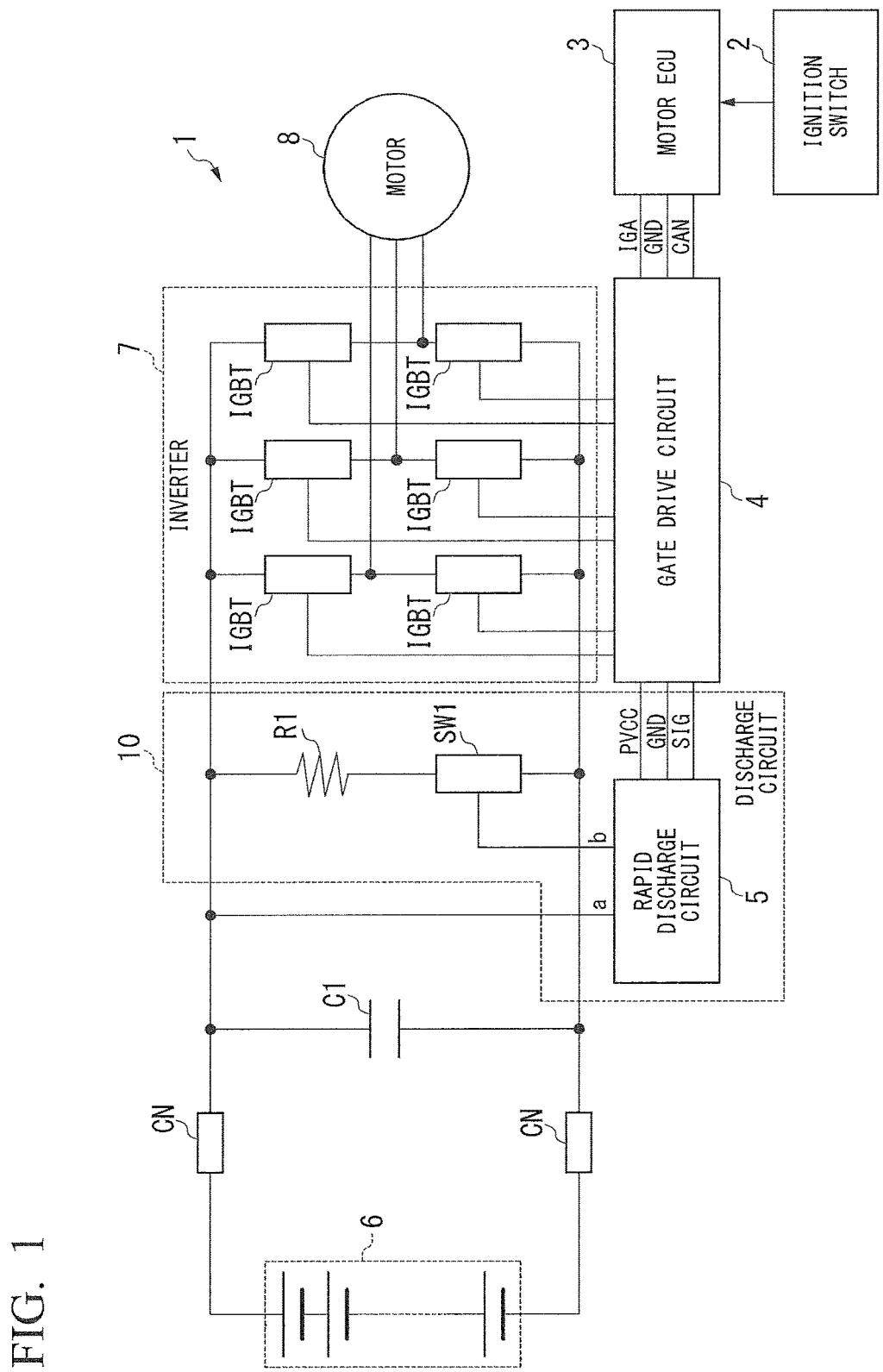
FIG. 1 is a circuit diagram illustrating an overall configuration of a vehicle power supply device according to the present embodiment.

FIG. 1 is a circuit diagram illustrating an overall configuration of a vehicle power supply device 1 (a discharge control device) according to the present embodiment.

As illustrated in FIG. 1, the vehicle power supply device 1 includes an ignition switch (IG SW) 2, a motor engine control unit (ECU) 3, a gate drive circuit 4, a battery 6, an inverter 7, a motor 8, a discharge circuit 10, a contactor CN, and a smoothing capacitor C1. In addition, the discharge circuit 10 includes a rapid discharge circuit 5, a resistor R1, and a switch SW1.

The ignition switch 2 is a switch for switching the vehicle power supply device 1 to an ON state or an OFF state.

The motor ECU 3 controls the gate drive circuit 4 when the ignition switch 2 is in the ON state. The motor ECU 3 and the gate drive circuit 4 are connected by ground (GND) (a reference voltage), a signal line of a control area network (CAN), a signal line of IGT (an ignition signal), or the like.

The gate drive circuit 4 and the rapid discharge circuit 5 are connected by the GND, a PVCC, the signal line of the CAN, or the like. In addition, the PVCC is a power supply voltage supplied from the rapid discharge circuit 5. When the ignition switch 2 is in the ON state, the gate drive circuit 4 controls a gate of an insulated gate bipolar transistor (IGBT) (a gate bipolar transistor) provided in an inverter 7 according to a control signal of the CAN output by the motor ECU 3. In addition, the gate drive circuit 4 outputs a control signal SIG based on the control signal of the CAN output by the motor ECU 3 to the rapid discharge circuit 5 when the ignition switch 2 is switched from the ON state to the OFF state or when the ignition switch 2 is switched from the OFF state to the ON state. In addition, the control signal SIG includes a control, a discharge permission instruction, a discharge permission cancellation instruction, or the like for the rapid discharge circuit 5.

The battery 6 is a direct current storage battery. The storage battery 6 is, for example, a plurality of battery modules connected in series and may include a breaker or a fuse. The battery 6 is connected to both ends of the smoothing capacitor C1 via the contactor CN. The smoothing capacitor C1 plays a role in storing a direct current output by the battery 6 and suppressing a change in output power of the inverter 7.

The discharge circuit 10 controls a charge stored in the inverter 7 and the smoothing capacitor C1 to be rapidly discharged in response to the control signal SIG output by the gate drive circuit 4 when the ignition switch 2 is switched from the ON state to the OFF state (hereinafter also referred to as a rapid discharge). In addition, the rapid discharge circuit 5 controls the rapid discharge to be cancelled in response to the control signal SIG when the ignition switch 2 is switched from the OFF state to the ON state.

The resistor R1 and the switch SW1 are connected in series. The resistor R1 and the switch SW1 are connected in parallel to the smoothing capacitor C1 and are further connected to the inverter 7. The resistor has one end connected to a positive electrode side of the battery 6, one end of the smoothing capacitor C1, and a positive electrode side of the inverter 7, and has the other end connected to one end of the switch SW1. The switch SW1 is a mechanical switch or a semiconductor switch. The switch SW1 has the other end connected to a negative electrode side of the battery 6 and a negative electrode side of the inverter 7 and has a control terminal connected to the rapid discharge circuit 5. The switch SW1 performs switching between the ON state and the OFF state according to control of the rapid discharge circuit 5.

The contactor CN is a type of mechanical switch and sets an opened state or a closed state between the battery 6 and the inverter 7. In addition, a first contactor CN is provided between the positive electrode side of the battery 6 and the positive electrode side of the inverter 7, and a second contactor CN is provided between the negative electrode side of the battery 6 and the negative electrode side of the inverter 7.

The rapid discharge circuit 5 has a terminal a connected to a power supply line (the positive electrode side of the battery 6) and a terminal b connected to a control terminal of the switch SW1. The rapid discharge circuit 5 switches the switch SW1 to the ON state in response to the control signal SIG output by the gate drive circuit 4 when the ignition switch 2 is switched from the ON state to the OFF state. Thereby, the rapid discharge circuit 5 controls the charge stored in the inverter 7 and the smoothing capacitor C1 to be rapidly discharged via the resistor R1. In addition, the rapid discharge circuit 5 switches the switch SW1 to the OFF state in response to the control signal SIG when the ignition switch 2 is switched from the OFF state to the ON state. Thereby, the rapid discharge circuit 5 controls the rapid discharge to be cancelled. In addition, a configuration of the rapid discharge circuit 5 will be described below.

The inverter 7 is constituted of, for example, an IGBT. The inverter 7 generates an alternating current having each of three phases (UVW phases) by controlling the gate drive circuit 4 and supplies the motor 8 with the generated alternating current having each of the phases to drive the motor 8. In addition, the inverter 7 may be configured to cause the motor 8 to function as a power generator that supplies power generated by the motor 8 as regenerative power to the battery when the vehicle decelerates.

The motor 8 is, for example, a three-phase motor. The motor 8 rotates to drive wheels (not illustrated) of the vehicle.

Next, a configuration example of the rapid discharge circuit 5 will be described.

Figures 2A, 2B:
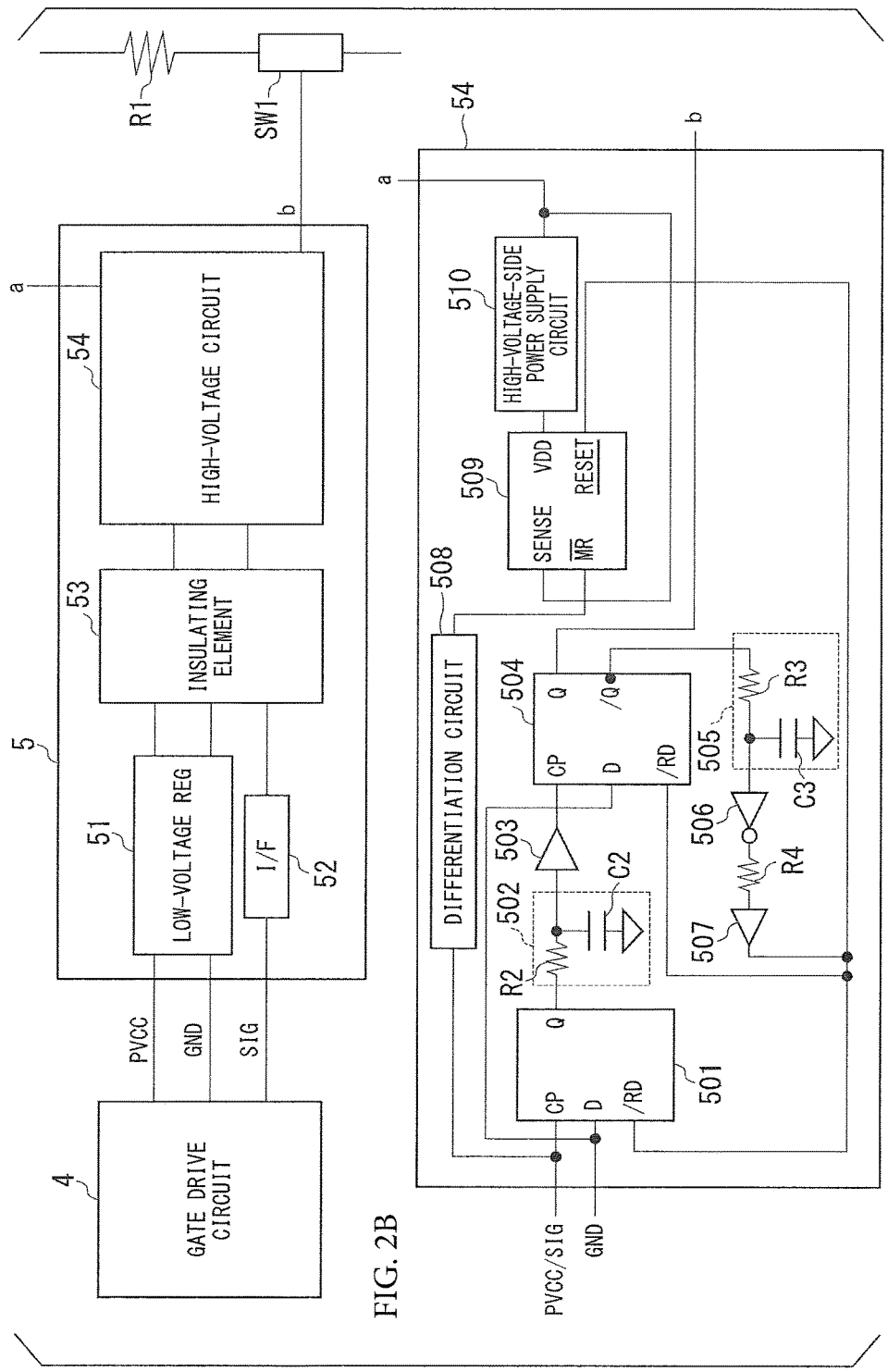
FIGS. 2A and 2B are block diagrams of a configuration example of a rapid discharge circuit and a high-voltage circuit provided in the rapid discharge circuit according to the present embodiment.

FIGS. 2A & 2B are block diagrams of a configuration example of the rapid discharge circuit 5 and a high-voltage circuit 54 provided in the rapid discharge circuit 5 according to the present embodiment. FIG. 2A is a block diagram of a configuration example of the rapid discharge circuit 5 and FIG. 2B is a block diagram of a configuration example of the high-voltage circuit 54.

As illustrated in FIG. 2A, the rapid discharge circuit 5 includes a low-voltage REG 51, an interface (I/F) 52, an insulating element 53, and the high-voltage circuit 54.

The low-voltage REG 51 converts a PVCC (power supply voltage) supplied by the gate drive circuit 4 into a predetermined voltage and supplies the converted power supply voltage to the high-voltage circuit 54 via the insulating element 53.

The I/F 52 is an interface circuit which extracts a trigger signal for the high-voltage circuit 54 from the control signal SIG and outputs the extracted trigger signal to the high-voltage circuit 54 via the insulating element 53. In addition, the trigger signal is switched from a low (L) level to a high (H) level when the ignition switch 2 is switched from the OFF state to the ON state, and is switched from the H level to the L level when the ignition switch 2 is switched from the ON state to the OFF state.

The insulating element 53 is an element for insulating the low-voltage REG 51 and the high-voltage circuit 54 and insulating the I/F 52 and the high-voltage circuit 54, and is, for example, a photo coupler, a transformer, or the like.

The power supply voltage from the low-voltage REG 51 is supplied to the high-voltage circuit 54. The high-voltage circuit 54 switches the switch SW1 in response to the trigger signal output by the I/F 52.

As illustrated in FIG. 2B, the high-voltage circuit 54 includes a logic circuit 501 (a flip-flop), a delay circuit 502, a buffer 503, a logic circuit 504 (a flip-flop), a delay circuit 505, an inverting circuit 506, a resistor R4, a buffer 507, a differentiation circuit 508, a reset circuit 509, and a high-voltage-side power supply circuit 510. In addition, the delay circuit 502 includes a resistor R2 and a capacitor C2. The delay circuit 505 includes a resistor R3 and a capacitor C3.

The logic circuit 501 and the logic circuit 504 are, for example, D-type flip-flops.

The logic circuit 501 has one input terminal D connected to the GND, the other input terminal CP to which the trigger signal is input, and a reset terminal /RD to which a reset signal output by the reset circuit 509 is input. The logic circuit 501 outputs an output signal from an output terminal Q to the delay circuit 502 in response to the trigger signal.

The delay circuit 502 delays the output signal output by the logic circuit 501, and outputs the delayed signal to the logic circuit 504 via the buffer 503, which is a buffer circuit.

The logic circuit 504 has one input terminal D connected to the GND, the other input terminal CP to which the signal output by the buffer 503 is input, and a reset terminal /RD to which the reset signal output by the reset circuit 509 is input. In response to the input signal, the logic circuit 504 outputs a switching signal from one output terminal Q to the control terminal of the switch SW1 and outputs a signal from the other output terminal /Q to the delay circuit 505.

The delay circuit 505 delays the signal output by the logic circuit 504 and outputs the delayed signal to the inverting circuit 506. The inverting circuit 506 inverts the signal output by the delay circuit 505 and outputs the inverted signal to the reset terminal /RD of each of the logic circuit 501 and the logic circuit 504 via the resistor R4 and the buffer 507 which is the buffer circuit. That is, a signal output by the logic circuit 504 and passing through the buffer 507 from the delay circuit 505 is input to the reset terminal /RD of each of the logic circuit 501 and the logic circuit 504 in addition to the reset signal output by the reset circuit 509.

The trigger signal is input to the differentiation circuit 508. The differentiation circuit 508 differentiates the input trigger signal and outputs the differentiated signal to a manual reset terminal /MR of the reset circuit 509. The differentiation circuit 508 is configured to include, for example, a resistor and a capacitor.

The reset circuit 509 is, for example, a reset integrated circuit (IC). The reset circuit 509 has a power supply terminal VDD to which a power supply voltage is supplied from the high-voltage-side power supply circuit 510, a terminal SENSE to which a battery voltage is input from the battery 6, and the manual reset terminal /MR to which the signal obtained by differentiating the trigger signal output by the differentiation circuit 508 is input. The reset circuit 509 changes a signal level of a reset terminal /RESET from an L level to an H level when a voltage value of the terminal SENSE is greater than a predetermined threshold value and changes the signal level of the reset terminal /RESET from the H level to the L level when the voltage value of the terminal SENSE is less than the predetermined threshold value.

The high-voltage-side power supply circuit 510 converts the battery voltage supplied from the battery 6 into the power supply voltage VDD and supplies the power supply voltage VDD obtained through the conversion to the reset circuit 509.

Next, an operation example of the high-voltage circuit 54 will be described.

Figure 3:
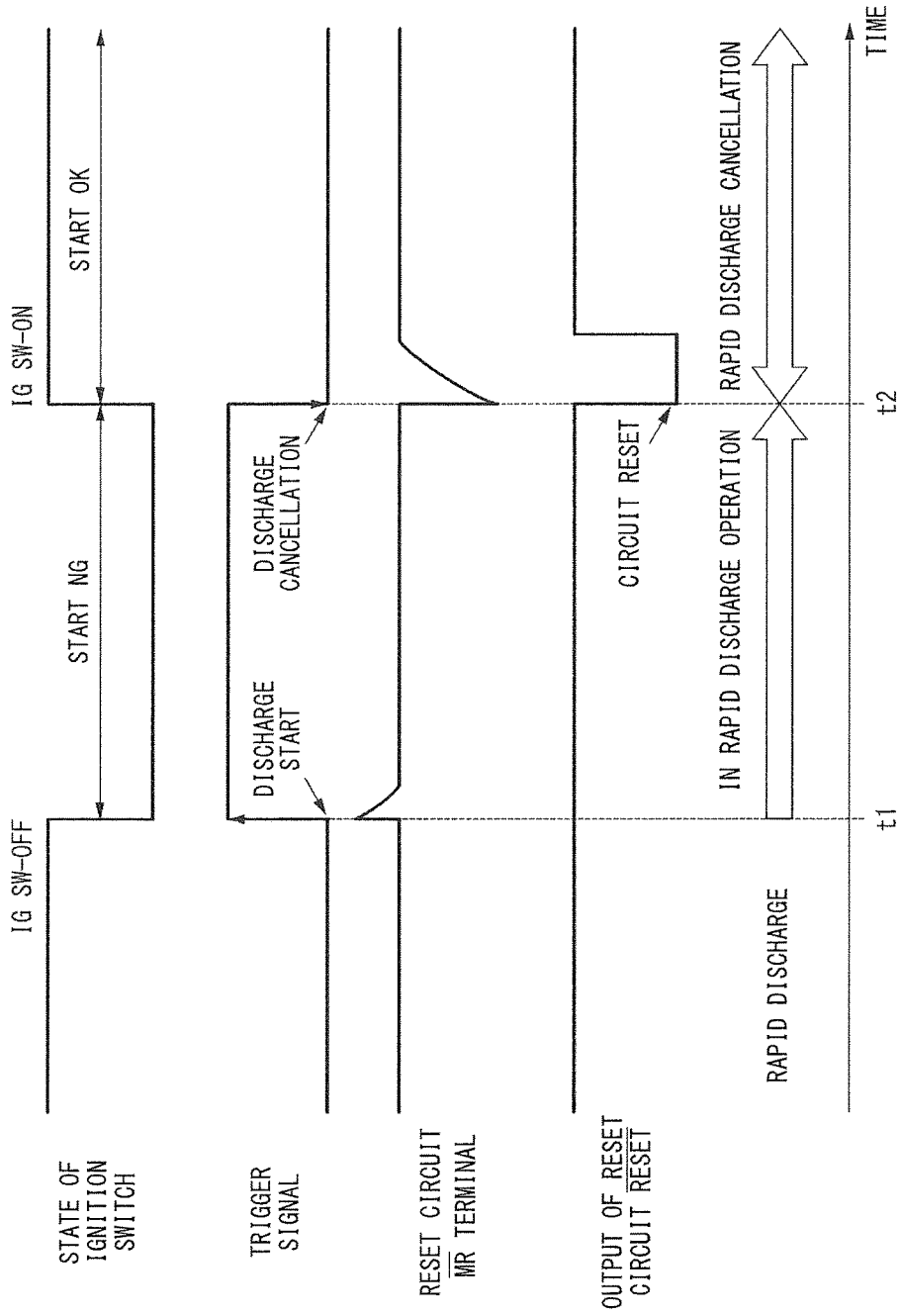
FIG. 3 is a diagram illustrating an operation example of the high-voltage circuit according to the present embodiment.

FIG. 3 is a diagram illustrating an operation example of the high-voltage circuit 54 according to the present embodiment. In FIG. 3, the horizontal axis represents time and the vertical axis represents a level of each signal.

At time t1, the ignition switch 2 is switched from the ON state to the OFF state. For a period from time t1 to time t2, the ignition switch 2 is maintained in the OFF state. As a result of the ignition switch 2 being switched from the ON state to the OFF state, a trigger signal is input to the logic circuit 501 and the reset circuit 509.

In response to a rising edge of the trigger signal, the logic circuits 501 to 504 generate a switching signal and set the switch SW1 to the ON state according to the generated switching signal, thereby starting a rapid discharge of a charge stored in the smoothing capacitor C1 via the resistor R1 and the switch SW1.

Next, at time t2, the ignition switch 2 is switched from the OFF state to the ON state. Thereby, the trigger signal is switched from the H level to the L level. In addition, a signal obtained by the differentiation circuit 508 differentiating the trigger signal is input to the manual reset terminal /MR of the reset circuit 509. According to the differentiated signal, the reset circuit 509 changes the reset signal from the H level to the L level for a predetermined period. In addition, the reset signal /RESET is in the ON state during the L level and in the OFF state during the H level. As described above, the differentiation circuit 508 and the reset circuit 509 differentiate a falling edge of the trigger signal and set the reset signal to the L level for a predetermined period according to a differentiation component so that the logic circuit 501 and the logic circuit 504 are reset. Thereby, in the present embodiment, it is possible to cancel the rapid discharge when the ignition switch 2 is switched from the OFF state to the ON state.

In the conventional technology, a discharge operation is continued until discharge is completed when the discharge of a charge stored in a smoothing capacitor is started at a timing of a rising edge of a trigger signal. Thus, in the conventional technology, it is impossible to cancel the discharge operation even when the ignition switch 2 is switched from the OFF state to the ON state during this discharge operation, and it is necessary to provide a standby time for restarting a vehicle power supply device when the ignition switch 2 is in the ON state.

On the other hand, according to the present embodiment, a standby time for restarting a vehicle power supply device when the ignition switch 2 is in the ON state when the rapid discharge is canceled at the timing of the falling edge of the trigger signal can be shortened even more than in the conventional technology. As a result, according to the present embodiment, it is possible to quickly start a system of the vehicle when the ignition switch 2 is in the ON state again during the discharge period after the ignition switch 2 is switched from the ON state to the OFF state.

In addition, in the present embodiment, a reset operation is performed when the ignition switch 2 for the logic circuit (the logic circuit 501 or the logic circuit 504) is in the ON state after being in the OFF state using a signal obtained by the differentiation circuit 508 differentiating the trigger signal. As a result, according to the present embodiment, it is possible to quickly start the system of the vehicle when the ignition switch 2 is in the ON state again during the discharge period because the reset operation is applied when the ignition switch 2 is in the ON state after being in the OFF state.

In addition, although an example in which the high-voltage circuit 54 includes two logic circuits (the logic circuit 501 and the logic circuit 504) has been described in the present embodiment, it is only necessary to provide at least one logic circuit, and the logic circuit may be reset when the ignition switch 2 is in the ON state after being in the OFF state.

Although the vehicle power supply device 1 according to the embodiment of the present invention has been described above, the present invention is not limited to the above-described embodiment and may be freely changed within the scope of the present invention. For example, the present invention can be applied to moving objects such as a four-wheeled vehicle, a three-wheeled vehicle, a two-wheeled vehicle, a train, and a ship. In addition, the present invention can be applied to a system which drives a motor using an inverter.

What is claimed is:

1. A discharge control device comprising:
    a discharge circuit configured to include a switch and a resistor to discharge charges of a smoothing capacitor and a power converter which are connected to a high-voltage power supply, wherein the discharge circuit is configured to further include at least one flip-flop circuit, wherein the flip-flop circuit outputs a signal for setting the switch of the discharge circuit to the ON state for the fixed period when the ignition switch is changed from the ON state to the OFF state, and wherein the flip-flop circuit is reset to stop outputting the signal for setting the switch of the discharge circuit to the ON state for the fixed period when the ignition switch is changed from the OFF state to the ON state during the period in which the discharge circuit performs the discharging.

2. The discharge control device according to claim 1, wherein the discharge circuit is configured to further include a reset circuit, and wherein the reset circuit outputs a reset signal to the flip-flop circuit when the ignition switch is changed from the OFF state to the ON state during the period in which the discharge circuit performs the discharging.

3. The discharge control device according to claim 2, wherein the discharge circuit is configured to further include a differentiation circuit, wherein the differentiation circuit differentiates a signal indicating the OFF state and the ON state in the ignition switch, and wherein the reset circuit outputs the reset signal to the flip-flop circuit when the differentiated signal indicates that the ignition switch is changed from the OFF state to the ON state during the period in which the discharge circuit performs the discharging.

* * * * *